(12) United States Patent
Miller

(10) Patent No.: US 9,535,223 B2
(45) Date of Patent: Jan. 3, 2017

(54) OPTICAL ALIGNMENT SYSTEM

(71) Applicant: Xyratex Technology Limited, Havant (GB)

(72) Inventor: Alistair Allen Miller, Hayling Island (GB)

(73) Assignee: Xyratex Technology Limited, Havant (GB)

( * ) Notice: Subject to any disclaimer, the term of this patent is extended or adjusted under 35 U.S.C. 154(b) by 332 days.

(21) Appl. No.: 14/098,309

(22) Filed: Dec. 5, 2013

(65) Prior Publication Data

US 2015/0160420 A1   Jun. 11, 2015

(51) Int. Cl.
  *G02B 6/36* (2006.01)
  *G02B 6/42* (2006.01)
  *G02B 6/38* (2006.01)

(52) U.S. Cl.
  CPC .......... *G02B 6/4226* (2013.01); *G02B 6/3897* (2013.01); *G02B 6/428* (2013.01)

(58) Field of Classification Search
  CPC ...... G02B 6/4226; G02B 6/3897; G02B 6/428
  USPC .......................................................... 385/90
  See application file for complete search history.

(56) References Cited

U.S. PATENT DOCUMENTS

| 4,773,727 A | 9/1988 | Le Pivert | |
| 2004/0052470 A1* | 3/2004 | Kim | G02B 6/30 385/52 |

FOREIGN PATENT DOCUMENTS

| DE | 36 27 687 | 2/1988 |
| GB | 2 239 894 | 7/1991 |

OTHER PUBLICATIONS

United Kingdom Search Report mailed May 13, 2014 in corresponding United Kingdom Patent Application No. GB1321479.6.

* cited by examiner

*Primary Examiner* — Jerry Blevins
(74) *Attorney, Agent, or Firm* — Mueting, Raasch & Gebhardt, P.A.

(57) ABSTRACT

An optical alignment system for aligning an optical component is provided. The system includes an alignment component configured to be moveable in a plane and in a fixed relationship with the optical component. Typically the alignment component houses an optical fiber MT ferrule. One or more driving components are further provided typically in the form of a ball headed adjustment screw. The driving components are configured to be moveable, relative to the alignment component, in a first linear direction. At least a component of the first linear direction is parallel with the normal of the plane. The driving component, when forced along the first linear direction and in contact with the alignment component, imparts a force upon the alignment component, in the plane, to move the optical component in the plane. An alignment frame accommodating the driving components may also be provided.

22 Claims, 8 Drawing Sheets

OPTICAL ALIGNMENT SYSTEM

The present invention relates to an optical alignment system for aligning an optical component. In particular, there is provided an optical alignment system for optically aligning an optical fibre ferrule to a further optical component mounted on a printed circuit board (PCB).

Optical alignment systems and components are known to house and align different optical components. Typically, such systems provide mechanisms to move, hence align, the optical components in a plurality of movement axes. For optical components such as optical fibres, lasers and other transmitting and/or receiving optical components where the optical propagation path is along a Z-axis, optical alignment systems exist that move the said optical component/s in the X-Y axes to facilitate optical alignment. This X-Y alignment is typically achieved by advancing a driving component (such as an adjustment screw) along the same axis in the X-Y plane as the desired axis of movement of the optical component. The driving member contacts and pushes the optical component along the same direction as the linear driving motion of the driving component. Typically, most simple aligning devices push directly on opposing surfaces so the resolution in movement is directly related to the screw pitch (advance per turn).

Modern telecommunication and data communication systems typically use optical fibre as the preferred data transmission system. Commonly, a plurality of optical fibres are co-located in the same cable or ribbon and terminate with an optical connector. Many types of optical connector exist with the majority of them having mechanical screw or snap fitting features that are intended to engage with complementary features of another optical connector. One of these connectors is called Mechanical Transfer (MT) connector, wherein two alignment pins push into and engage with complementary holes in the other connector. Such connectors are commonly used to connect with optical or optoelectronic devices. Such MT connectors are, however, not suitable, by themselves, to optically align the optical fibres in the connector with bespoke, un-conventional components such as optical chips (also referred to throughout as 'optical engines').

Some optical engines have no inherent aligning features such as pin holes typically found on other devices such as optical connectors. Connector pin holes normally allow precision pins of a MT ferrule to mate and accurately maintain the optical alignment of the fibres of the MT ferrule to the input/output optical axes of the optical engine. Without these complementary aligning pins and holes, the faces of the optical fibres can slide along the faces of the other connecting fibres or the face of the optical engine.

The alignment pins of an MT connector (or other mechanical alignment features of the connectors) are not configured by themselves to provide optical alignment to such 'other' optical components that do not have complementary alignment features. Therefore, in order to optically align the fibres in the ferrule connector to an optical engine, a further device is typically needed to provide the required alignment. Custom made connectors (for snap-fitting to the MT pins) for accommodating the particular size and shape of optical engine may be made but these would be expensive and only usable with that particular engine. More general solutions exist in the form of optical alignment devices, which rely on the active alignment of one of the components with the other.

Most of the active optical alignment devices and systems available from optical equipment suppliers such as Thorlabs, Norland or Edmund Scientific are intended for laboratory use and are normally mounted on optical benches. They would be prohibitively expensive to use as a permanent aligning product dedicated to a single optical engine for example.

According to a first aspect of the present invention, there is provided an optical alignment system for aligning an optical component, the system comprising: an alignment component configured to be: moveable in a plane; and, in a fixed relationship with the optical component; a driving component configured to be moveable, relative to the alignment component, in a first linear direction wherein at least a component of the said first linear direction is parallel with the normal of the said plane; the system is configured such that the driving component, when forced along the first linear direction and in contact with the alignment component, imparts a force upon the alignment component, in the plane, to move the optical component in the plane.

Preferably, the first linear direction is substantially parallel with the normal of the said plane.

In one example the alignment component may be an integrated part of the optical component or optical component housing.

The term 'substantially parallel' in this context is taken to mean that the majority of the force of the driving component is directed along the normal from the said plane, such that any other component of force of the driving component not parallel to the normal is negligible and does not transmit an imparted force upon the alignment component that is sufficient to overcome the inertia of movement of the alignment component in the plane.

Preferably the alignment component comprises an alignment surface non-parallel with the said plane and configured to contact the driving component.

The alignment surface comprises a surface normal comprising a vector component parallel to the plane of movement of the first component.

Preferably, the alignment surface is angled between 5-30 degrees from the normal of the said plane.

Preferably, the alignment surface is angled between 5-10 degrees from the normal of the said plane.

Preferably, the alignment surface comprises a substantially planar surface.

The term 'substantially' in this context is taken to mean that the surface is flat and any surface irregularities are negligible in size in comparison to the contact area of the driving and alignment components.

Preferably the system comprises: a plurality of driving components; and, a plurality of alignment surfaces; wherein: the alignment component comprises at least one of the said alignment surfaces; and, each alignment surface is associated with at least one of the plurality of driving components; the system is configured such that each driving component, when forced along its respective first linear direction and in contact with its associated alignment surface, transmits an imparted force upon the associated alignment surface, in the plane.

Preferably the system comprises: a first one or more of the said alignment surfaces; and, a second one or more of the said alignment surfaces, each running along an oblique angle in the plane to the one or more first alignment surfaces; and, a third one or more of the said alignment surfaces, each: running along an oblique angle in the plane to the one of more first alignment surfaces; and, oppositely oriented in the plane to the one or more second alignment surfaces.

Preferably, the system is configured such that: at least a first and a second driving component are each configured to:

contact at least one of the first alignment surfaces at a respective first and second contact position in the plane; and, transmit respective first and second imparted forces along a first direction in the plane; and, at least a third driving component is configured to: contact one of the second alignment surfaces at a third contact position in the plane; and, transmit a third imparted force along an oblique angle in the plane to the first and second imparted forces; and, at least a fourth driving components is configured to: contact one of the third alignment surfaces at a fourth contact position in the plane; and, transmit a fourth imparted force: along an oblique angle in the plane to the first and second imparted forces; and, oppositely oriented to the third imparted force.

An oblique angle is an angle that is not a right angle or a multiple of a right angle.

Oppositely orientated in the context of the present application means that, for example, for a first and second surface slope, one of the orthogonal components of the said first slope is along the same direction as an orthogonal component of the said second slope, whilst the other orthogonal component of the first slope is in the opposite direction to the other orthogonal components of the second slope.

The system is preferably configured such that none of the driving components are configured to impart a force upon the alignment component in a direction that directly opposes the direction of the imparted force transmitted by any of the other second components.

The system is preferably configured such that each imparted force comprises:

I) an identical direction to the direction of at least one of the other imparted forces;
or;
II) at least one vector component (non-parallel to the direction of the imparted force), that when separately compared to each of the other imparted forces, is parallel to the direction of the compared imparted force.

In this case, the third and fourth imparted forces may:

A) be non-parallel to each other; and,
B) each comprise a first vector component that directly opposes a vector component of the other said third/fourth imparted force; and,
C) each comprise a second vector component that directly opposes the direction of the said first and second imparted forces.

Preferably, the said first and second driving components are spatially separated in the plane; wherein: the third driving component and second alignment surface are configured such that the direction of the third imparted force extending from the third contact position points between the first and second contact positions; the fourth driving component and third alignment surface are configured such that the direction of the fourth imparted force extending from the fourth contact position points between the first and second contact positions.

Preferably system is configured such that: the first and second contact positions lie substantially on a first axis in the plane; the third and fourth contact positions lie substantially on a second axis in the plane; the first and second axis are parallel and spaced apart in the plane.

Preferably, the third and fourth contact positions are spaced further apart than the first and second contact positions.

Preferably, the alignment component comprises the said plurality of alignment surfaces.

Preferably, the alignment component is configured to house the optical component.

Preferably, the driving component comprises a screw.

Preferably, the screw comprises a substantially hemispherical terminating end for contact an alignment surface.

Preferably, the system comprises an alignment frame; wherein the one or more driving components are at least partially accommodated within the alignment frame.

Preferably, the said alignment frame comprises one or more through holes; each through hole configured to accommodate a driving component.

Preferably, each said through hole is substantially elongated along an axis perpendicular to the said plane.

Preferably, the system further comprises a platform comprising a fixing for removable attaching: the alignment frame; and, the alignment component.

According to a second aspect of the present invention, there is provided an optical alignment component configured to: be contactable by an external driving component and move along a reference surface in an alignment plane; and, rigidly secure an optical component; the alignment component comprising: one or more base surfaces parallel to the alignment plane and configured to slide upon the reference surface; and, a plurality of alignment surfaces, each at an oblique angle to the normal of the base surface extending away from the reference surface; the plurality of alignment surfaces comprising: a first one or more of the said alignment surfaces; and, a second one or more of the said alignment surfaces, each running along an oblique angle in the alignment plane to the one or more first alignment surfaces; and, a third one or more of the said alignment surfaces, each: running along an oblique angle in the alignment plane to the one of more first alignment surfaces; and, oppositely oriented in the alignment plane to the one or more second alignment surfaces.

Preferably, the plurality of alignment surfaces are angled between 5-30 degrees from the said normal of the base surface extending away from the reference surface.

According to a third aspect of the present invention, there is provided an alignment frame for aligning an alignment component upon a reference surface of a platform; the frame comprising: an attachment to rigidly secure the frame to the platform; and, at least a first surface remote from the reference surface; and, at least a second surface remote from the reference surface; and, a plurality of driving components for contacting the optical component, a plurality of through holes wherein each through hole: extends between a first and a second surface along the same direction as the other said through holes; is configured to accommodate a separate one of the said driving components and allow the said driving component to at least partially move out of the through hole from the first surface and contact the alignment component.

Preferably, the through holes are cylindrical and comprise and threaded internal surface.

Preferably, the driving components comprise ball ended adjustment screws.

Preferably, the frame is configured such that: a first and a second of the plurality of holes are located upon a first axis parallel to the alignment plane; and, a third and fourth of the plurality of holes are located upon a second axis parallel to the alignment plane and parallel to the first axis.

Preferably, the frame is configured such that: the said first and second holes are symmetrical about a third axis: parallel with the alignment plane; and, perpendicular to the first axis and second axis; the said third and fourth holes are symmetrical about the said third axis.

Embodiments of the present invention will now be described in detail with reference to the accompanying drawings, in which.

Figure 1:
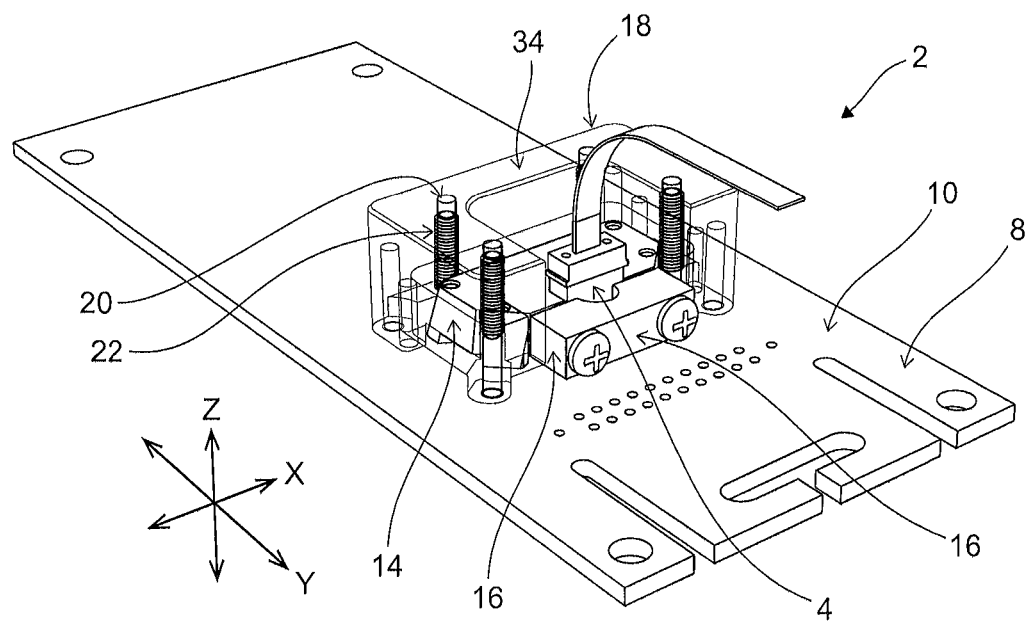
FIG. 1 shows an example of an optical alignment system where a frame, comprising driving components in the form of ball end adjustment screws, is mounted on a PCB; the frame accommodating an alignment component that houses an optical component.

An optical alignment system 2 is presented for optically aligning one optical component 4 to another optical component 6. This may be, for example, an optical fibre 4 to a further optical fibre, or an optical fibre 4 (or set of optical fibres) to a solid state optical engine 6, or any other combination of optical components. Preferably, the optical alignment system optically aligns an optical fibre connector 4 having a plurality of optical fibres to an optical engine 6 that is mounted upon a PCB 8. In principle, any optical alignment system 2 may be constructed according to the principles as described herein. However, the following example is a preferred configuration of the optical alignment system 2. The alignment system 2 and features of the alignment system disclosed herein may be used in any suitable application including telecommunications and data communications.

References made to X, Y, Z axes and planes are only for the purposes of describing features of the device and are not intended to be limiting to a particular fixed orientation of each of the axes, but are intended to describe relative orientations between them.

The alignment system 2 presented herein preferably allows for a controlled movement of an optical fibre connector ferrule into an optimum light coupling position over an optical engine 6. In some examples, the optical alignment system 2 allows the coupling to another ferrule.

General

FIG. 1 shows an example of an optical alignment system 2 comprising a PCB 8 with an optical engine 6 (not shown) mounted to the top surface 10 of the PCB 8. On top of the engine 6 and the PCB top surface 10 lies an alignment component 12, housing an optical fibre MT ferrule 4 that terminates the end of a fibre ribbon. The alignment component 12 in this example is shown to have a first section 14 and second section 16 that act together to clamp the optical fibre MT ferrule 4. Throughout the application, the alignment component 12 may also be referred to, interchangeably, as the "clamp". On top of the PCB 8, there is an alignment frame 18 that partially surrounds the clamp 12 (allowing at least the second section 16 of the alignment component 12 to protrude horizontally beyond the frame 18) and contains through-holes 20 which accommodate driving components 22. In FIG. 1 (and FIG. 5) these driving components 22 are shown to be adjustment screws with a ball-headed end. The adjustment screws 22 are configured within the frame 18 to be able to be forced down (by rotational drive in this example) in a first linear direction 24 (in this case, vertically downwards parallel to the normal 26 of the PCB) through the frame 18 and towards the PCB 8 and alignment component 12. When the ball ends of the adjustment screws 22 contact the alignment component 12, they do so by contacting an alignment surface (28A-C) that is angled obliquely with respect to the direction of drive 24 of the adjustment screw 22. Once the contact has been made, further movement of the adjustment screw 22 along the same linear direction 24 transmits an imparted force 30 upon the alignment component 12, causing it to move along the plane (X-Y) 32 of the PCB. In this example, the movement is perpendicular to the direction of the linear direction 24 of drive of the adjustment screw 22. Having a plurality of these adjustment screws 22 contacting different sides, hence different surfaces 28A-C of the alignment component 22, allows the alignment system 2 to move (hence align) the alignment component 4 in various directions within the plane of movement 32.

As described later, different alignment surfaces 28A-C of the alignment component 12 together with the driving components 22 may allow the alignment component 12 to be moved along different axes of movement, in some circumstances a rotational axis. The alignment system 2 as described herein may therefore provide a user of the system the capability to actively align the optical component 4 housed in the alignment component 12 in the X-Y plane (as shown in FIG. 1), by adjusting the driving components 22 from a single side of the alignment frame 18. This is made possible by all the driving components 22 having a linear driving motion 24 along substantially the same direction.

In one example the alignment component may be an integrated part of the optical component.

Figure 7:
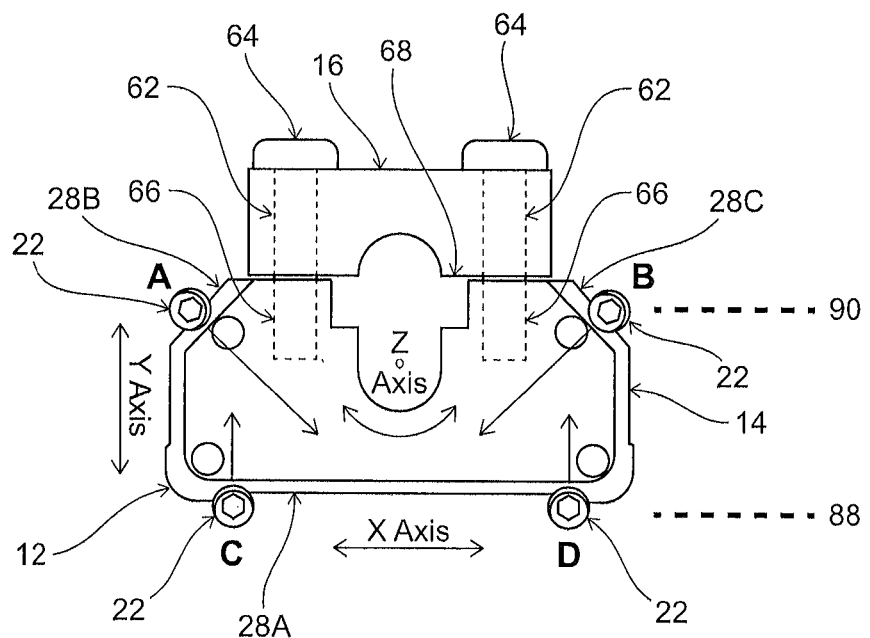
FIG. 7 shows a plan view of the alignment component, the driving components A, B, C and D of the frame and the forces impartible upon the alignment component as the driving components are forced downwardly towards and into the alignment component.

When the alignment component 12 and the frame 18 are in place, only four adjustment screws 22 are needed to shift the clamp 12 in the X or Y axis as well as rotation about the Z axis as shown in FIGS. 1 and 7. These position adjusting screws 22 are all easily accessible from the top side 34 of the frame. By placing all of these screws 22 on the same side 34 of the frame 18, there is also another benefit besides ease of access. The ball ends of the adjusting screws 22 contacting and pushing obliquely along inclined side surfaces 28A-C of the clamp 12 have the effect of reducing the amount of movement of the clamp 12 relative to the advance created by the screw's pitch. This makes it easier to fine tune the clamp into the best location. The angled sides 28A-C of the clamp have the same effect as gear reduction ratio in a transmission system except that this is an end linear effect rather than a rotational effect. With an alignment surface 28A-C oblique angle of ~5° to the PCB surface normal 26, the movement of the clamp 12 is roughly ⅕ that of the screw advance. In other words, a one millimeter advance on the screw 22 will only move the clamp 12 by 0.2 mm.

Having these adjustment screws 22 all facing the same direction has a further advantage. The screws 22 apply a downward force when contacting the clamp 12 thereby keeping it in contact with the PCB 8 and the ferrule 4 in contact with the optical engine 6. The clamp 12 will still slide on the PCB 8 until all four adjustment screws 22 are tightened enough to keep it in place in all axes in the X-Y plane.

It can be seen that if the screws 24 were of a finer pitch (less linear advance per turn) and/or the angled alignment surfaces 28A-C on the clamp 12 were made with a shallower angle, the movement reduction could be increased even more. There is a practical limit though to making these changes if size or the amount of aligning motion is an issue.

By loosening and tightening different screws 22, the user can actively align the optical component 4. Once the clamp 12 (hence optional component 4) is in the correct/desired position in the X-Y plane 32, it is preferably then locked in position. This may be accomplished by any suitable means. In the example shown in FIG. 1, the clamp 12 is fixed to the PCB 8 using four locking screws 50 inserted through locking screw holes in the underside of the PCB 8. In principle, any number of locking screws 50 or other fixing mechanism may be employed.

In principle, the alignment system 2 does not necessarily require all the driving components 22 to be driven perpendicularly to the imparted direction 24 of movement of the alignment component 12. Any one or more of the driving components 22 may be configured to be driven along an oblique angle to the normal 26 of the plane of movement 32 of the alignment component along the PCB top surface 10 (for example, see FIG. 10). At least one of the driving components 22 of the alignment system is either driven at an oblique angle or is driven perpendicularly to the plane of movement 32.

The configuration of:
the driving component 22 and its direction of movement 24; and,
the structure of the alignment component 12 at the point that it contacts the driving component that gives rise to the in-plane imparted force 30 upon the alignment component 12;
need not necessarily be limited to the example shown in FIG. 1.

Figure 10:
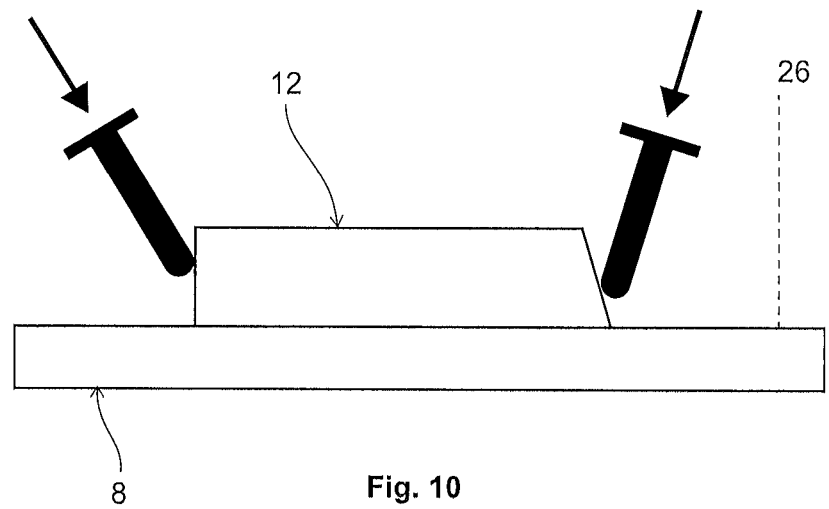
FIG. 10 shows a further example of an alignment component and two driving components.

FIG. 10 shows an alternative driving component 22/alignment component 12 arrangement. In this example, two different configurations are provided on two opposite sides of the alignment component 12. On the left hand side the alignment surface runs parallel with the normal 26 of the top surface 10 of the PCB whilst the associated driving component 22 is driven at an oblique angle to the same normal 26. On the right hand side of the same Figure, both the alignment surface and the driving component direction 24 are at an oblique angle to the said PCB top surface normal 26.

Figure 11:
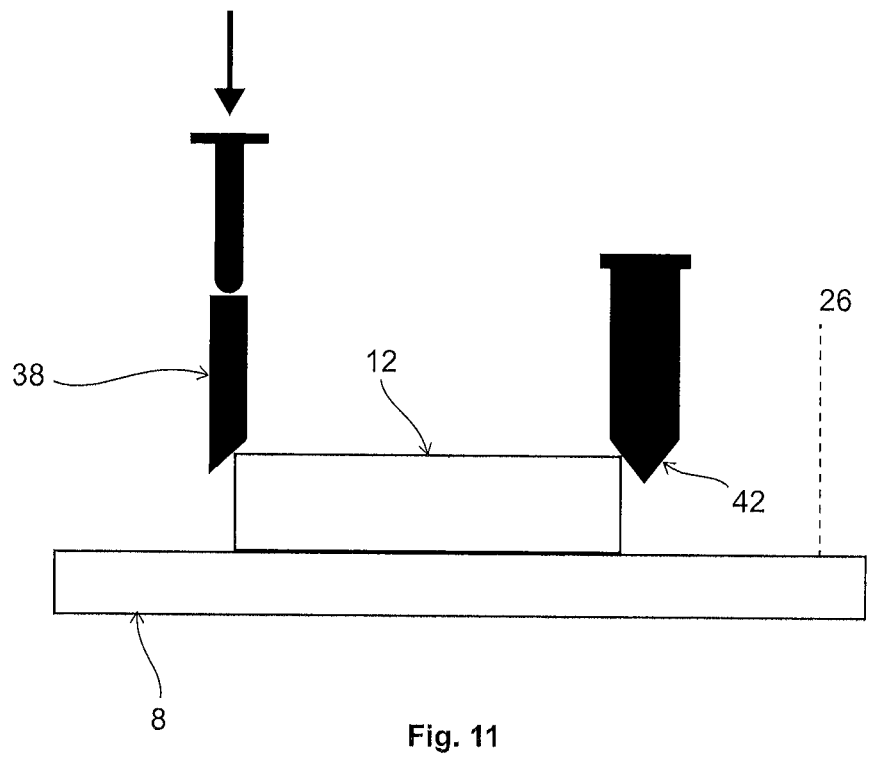
FIG. 11 shows another further example of an alignment component and two driving components.

FIG. 11 shows a further alternative arrangement of the driving component 22/alignment component 12. On the left hand side, the alignment surface is parallel to the PCB surface normal 26 whilst the driving component 22 comprises a screw that is driven parallel to the PCB surface normal 26 that then pushes a wedge ended component downwardly in the same direction, the wedge 38 comprising a contacting surface at an oblique angle to the PCB surface normal 26 that contacts the alignment component 12 at the edge connecting the top 40 and side surface of the alignment component 12. On the right hand side of FIG. 11, there is shown a similar configuration to the left hand side, except the driving component 22 is a single component with a cone end 42. The cone end 42 comprises an apex pointing directly downwards towards the PCB top surface 10. This provides the driving component 22 a constantly angled surface to contact the alignment component 12 as the screw turns.

The optical alignment system 2, as shown in FIG. 1, is now further described in detail, with reference to FIGS. 2, 3a, 3b, 4, 5, 6 and 7.

PCB

Figure 2:
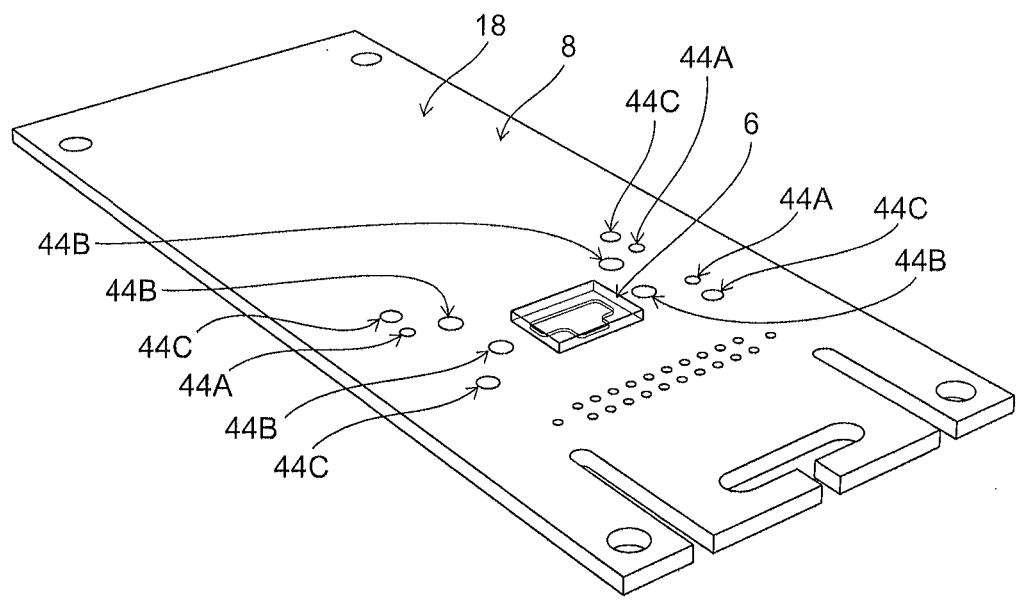
FIG. 2 shows the PCB of FIG. 1 with an optical engine mounted on the top surface of the PCB.

FIG. 2 shows an example of a PCB 8, wherein, an optical engine 6 is attached to the PCB 8. In principle, the alignment system 2 does not necessarily require a PCB 8, as shown in the examples of FIGS. 8 and 9. Furthermore, the PCB 8 may be any platform capable of mounting the frame 18 and alignment component 12. At least a portion of the optical engine 6 protrudes vertically above the top surface 10 of the PCB 8 wherein one or more optical interfaces of the engine 6 are located for optically coupling to the one or more optical fibres 4 of the ferrule held in the alignment component 12. In principle, the PCB may accommodate or support the engine or other optical component in any similar way. The PCB 8 also comprises a number of through-holes 44A-C extending from the top surface 10 to the bottom surface 46, through which screws and/or a number of other fixing members may be accommodated (for example, dowel pins 48 connecting the PCB to a frame 18 as described later).

The through holes 44 in the PCB 8 shown in FIGS. 1, 2, 3a and 3b are sized and position for particular purposes. Three of the holes are dowel pin holes 44A and are each sized to house a part of a dowel pin 48 extending from the frame 18. The dowel pins holes 44A comprise a hole radius substantially similar to the radius of the dowel pin 48, such that the dowel pin 48 is rigidly held in place in the X-Y plane when entering the dowel pin hole 44A. In principle, none or any number of dowel pins 48 (and corresponding dowel pin holes 44A in the PCB 8/frame 18) may be used.

The PCB further comprises alignment component fixing holes or locking screw holes 44B. Each locking screw hole 44B is configured to accommodate a part of a threaded portion of a locking screw 50 that enters the said hole from the bottom surface 46 of the PCB 8. Each of these holes 44B comprises a radius larger than the outer radius of the threaded portion of the locking screw 50 going through the hole 44B such that, when located in the hole, the screw 50 can nominally move laterally (in the X-Y plane) about the hole 44B. The hole 44B comprises a radius less than the radius of the head of the locking screw 50 so that the said locking screw can clamp onto the PCB 8 and hold the alignment component 12 in place.

The PCB 8 further comprises a third set of through holes 44C sized to accommodate frame fixing screws 52 that are inserted from underneath 46 the PCB 8 (i.e. into the bottom surface) and rigidly affix the frame 18 to the PCB 8.

In principle the PCB 8 or platform can use other means to:
Fix the frame 18 to the PCB 8,
Lock the alignment component 12 to the PCB 8;
and therefore may have some, none, or all of the type of holes and fixtures as described.

Alignment Component

Figure 3A:
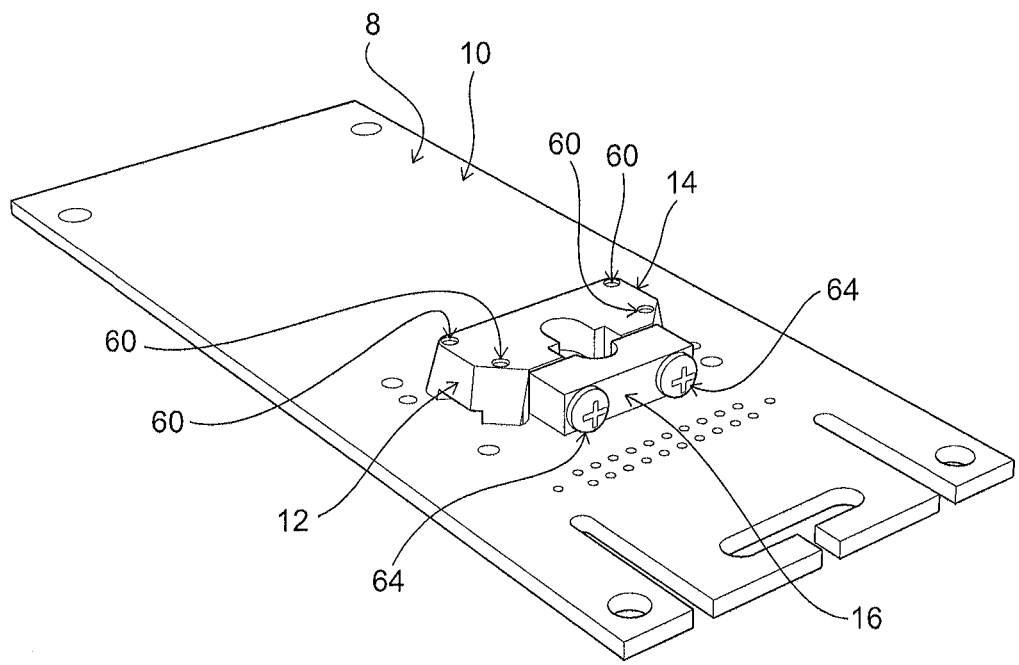
FIG. 3a shows the same PCB of FIG. 2 where an alignment component in the form of a clamp is positioned over the optical engine.

FIG. 3a shows the same PCB 8 as shown in FIG. 2, whereby the alignment component 12 has been located over the optical engine 6.

Figure 3B:
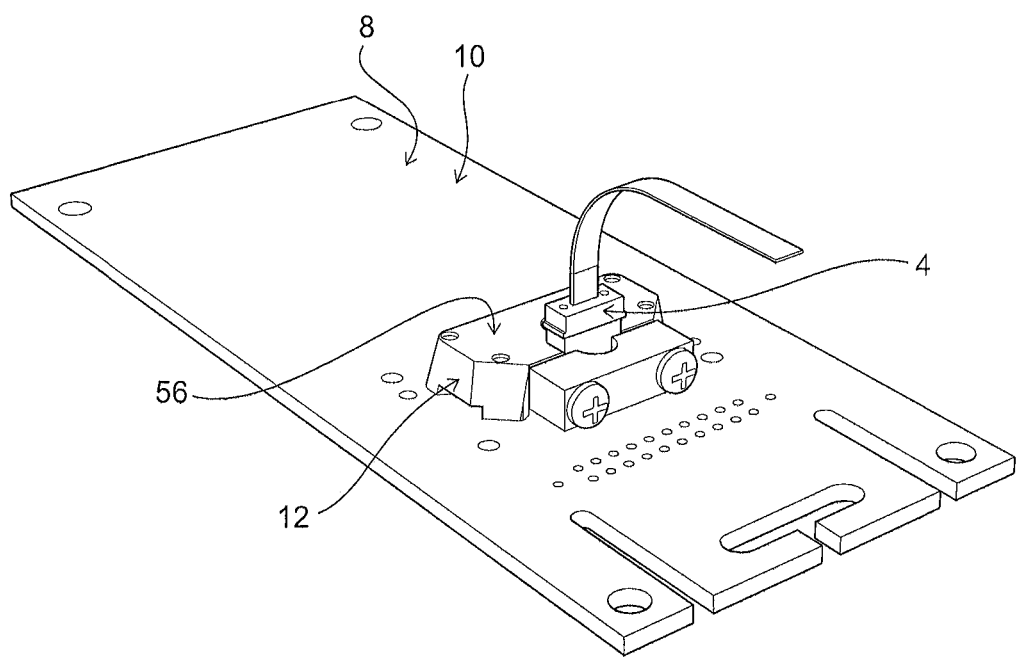
FIG. 3b shows the set-up of FIG. 3a wherein the clamp is housing an optical fibre MT ferrule.
Figure 4:
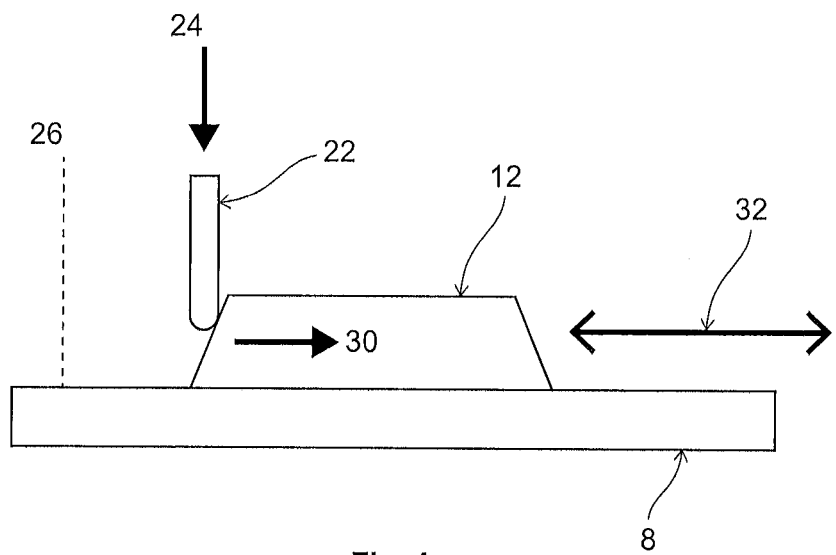
FIG. 4 shows a vertical cross section of a PCB and an alignment component and arrows showing the direction of the linear force of the driving component and the imparted force upon the alignment component.

FIG. 3b shows the same PCB 8 and alignment component 12 of FIG. 3a, whereby the alignment component 12 is shown accommodating and housing an optical fibre MT ferrule. In principle, the alignment component may be configured to hold and accommodate other types of ferrules.

In this example, the alignment component 12 is a clamp comprising a first section 14, with a number of peripheral alignment surfaces 28A-C configured to contact the adjustment screws 22. The first section 14 further provides an inwardly extending slot 54 along one of the sides of the first section 14, the slot 54 comprising surfaces that the optical fibre MT ferrule 4 maybe inserted into and butted up against.

The slot 54 is located on one of the sides that spans between the bottom surface 58 (also known as the base surface) and top surface 56 of the first section and comprises a plurality of substantially vertically extending surfaces that act to confine the optical component in a plurality of directions in the plane of movement 32. As shown in FIGS. 3a and 3b, this indented slot 54 comprises two opposing side walls, each orthogonally orientated to parts of a back wall.

When the MT ferrule 4 is inserted into the first section 14, the optical component 4 is, at least partially, surrounded at three of its sides such that the slot surfaces restrict (i.e. lock) the movement of the ferrule along both directions of the X axis and one direction of the Y axis. In principle, the alignment component may comprise any number of sections and may rigidly secure and accommodate any desired optical component in any manner that is within the principle of the alignment system.

Figure 5:
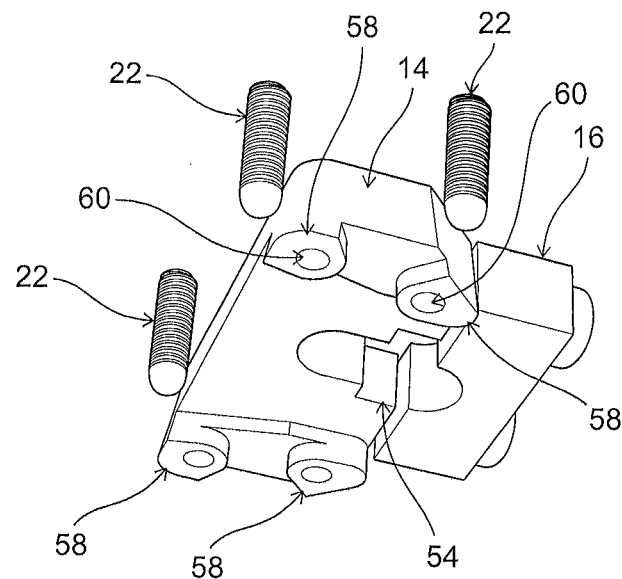
FIG. 5 shows a perspective view of the underneath of the alignment component of FIGS. 1-3b together with the ball ended screw driving components of the frame.

FIG. 5 shows a perspective view of the bottom of the alignment component 12 (also shown in this figure are three of the adjustment screws 22). The first section 14 of the alignment component 12 also comprises four closed-ended holes 60 in the bottom surface 58 configured to accommodate a locking component 50 (for example a screw) that can align with one of the through-holes 44B of the PCB 8. When the alignment component 12 has been adjusted for optical alignment, the locking screws 50 may be inserted through the back surface 46 of the PCB 8, through the PCB through-holes 44B, and screwed into the said four locking screw holes 60 (as shown in FIG. 5). In principle, one or any number or none of the locking screws 50 and corresponding holes 60 may be used.

Figure 6:
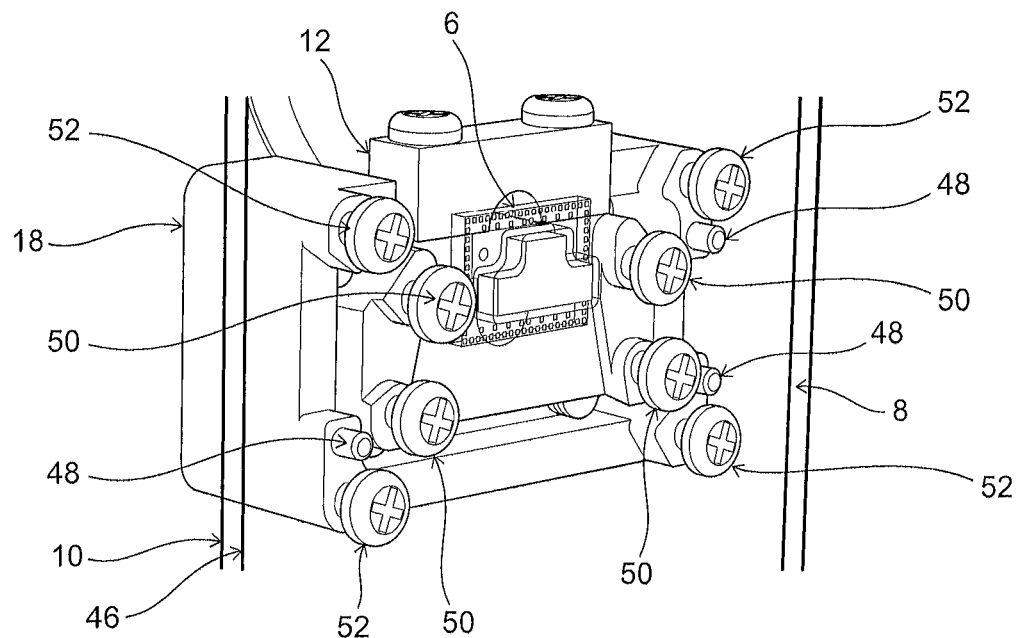
FIG. 6 shows a perspective view of the underside of the optical alignment system shown in FIG. 1 where the PCB is shown transparently in outline.

FIG. 6 shows such a configuration where the locking screws 50 have been inserted through the back surface 46 of the PCB 8 and screwed into the four bottom holes 60 of the first section 14 of the alignment component 12.

The second section 16 of the alignment component 12 comprises two horizontally extending through-holes 62, through which two clamp screws 64 can be inserted into, through and then screwed into two complementary horizontally extending closed-ended threaded holes 66 in the clamp 12. The second section 16 also comprises one or more further clamping surfaces 68, configured to restrict the movement of the ferrule 4 in the Y direction opposite to the Y direction restricted by the slot 54 of the first section 14 such that, when the first 14 and second 16 sections are fixed together by the clamping screws 64, the ferrule is restricted from moving in the X-Y plane.

The first section 14 comprises a bottom surface 58 configured to contact and slide upon the top surface 10 of the PCB 8. The said bottom surface 58 of the first section 14 may be subdivided into a plurality of bottom surfaces 58 as shown in FIG. 5, whereby each of the bottom surfaces 58 comprises an opening of the closed-ended hole 60 that is used for accommodating a locking screw 50 that locks the alignment component 12 to the PCB 8. The first section 14 also comprises a planar top surface 56. The outer-most peripheral sides of the first section 14 that join the planar top surface 56 of the first section 14 to the bottom planar surfaces 58 of the first section 14 have sloped side walls 28A-28C (alignment surfaces) oriented at an oblique angle with respect to the normal of the PCB 26. The normal of the PCB here being equivalent to the normal of the bottom planar surface of the first section 14 that extends into the first section 14, when the first section is upon the PCB. The first section 14 may have a plurality of these angled alignment surfaces 28A-C, including a first alignment surface 28A laterally extending along the plane in the X axis so that two of the said adjustment screws 22 (see screws C and D in FIG. 7) can contact and drive the alignment component 12 along the Y axis.

The alignment component 12 also comprises a second 28B and third 28C alignment surface, wherein the second alignment surface 28B runs along an oblique angle in the plane to the first alignment surface 28A. The third alignment surface 28C runs along a different oblique angle in the plane to the first alignment surface 28A and is further oppositely orientated in the plane to the second alignment surface 28B. Preferably, the portion of each alignment surface that is configured to be contactable by an adjustment screw 22 is a flat (planar) surface portion. Preferably, each alignment surface 28A-C is a flat surface extending between the bottom surface 58 of the first section 12 to the top surface 56 of the first section 14. In principle, the alignment component 12 may comprise any number of alignment surfaces. The alignment component may be an integrated part of the optical component.

The driving component 22 in this example is an adjustment screw.

The first section of the alignment component 12 as shown in FIGS. 3A and 3B is preferably:

Substantially rectangular in the X-Y plane, with the X direction being longer than the Y direction;

Substantially rectangular in the Y-Z plane, with the Y direction being longer than the Z direction;

Substantially rectangular in the X-Z plane with the X direction being longer than the Z direction.

The bottom surface of the first section alignment component 12 as shown in FIGS. 3a, 3b and 5 comprises four separate bottom surface areas 58 configured to contact the top surface 10 of the PCB 8. Each of the said areas 58 is located proximate to one of the corners of the first section 14 in the X-Y plane.

As shown in FIGS. 1, 3a, 3b and 5, the alignment component 12 in this example is not perfectly rectangular in the X-Y plane as the corners proximal to the C and D screws 22 in FIG. 7 are rounded whilst the corners proximal to the A and B screws 22 are angled surfaces 28B-C that are used to align the alignment component 12.

Between the four areas 58 of the bottom surface that contact the PCB 8, the bottom surface is raised upwards and into the body of the first section 14. This forms channels that allow the optical engine 6 to reside underneath the alignment component 12 and prevents any electrical transmission lines running along the top surface of the PCB 8 being contacted (hence possibly be damaged) by the alignment component 12.

Alignment Frame

Figure 12A:
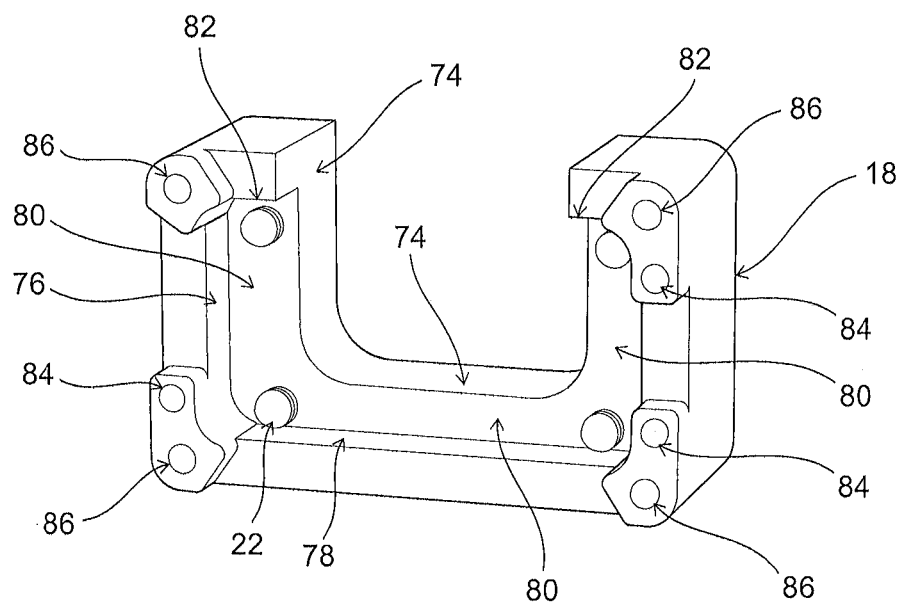
FIGS. 12a and 12b show perspective bottom and top views of the alignment frame of FIG. 1.
Figure 12B:
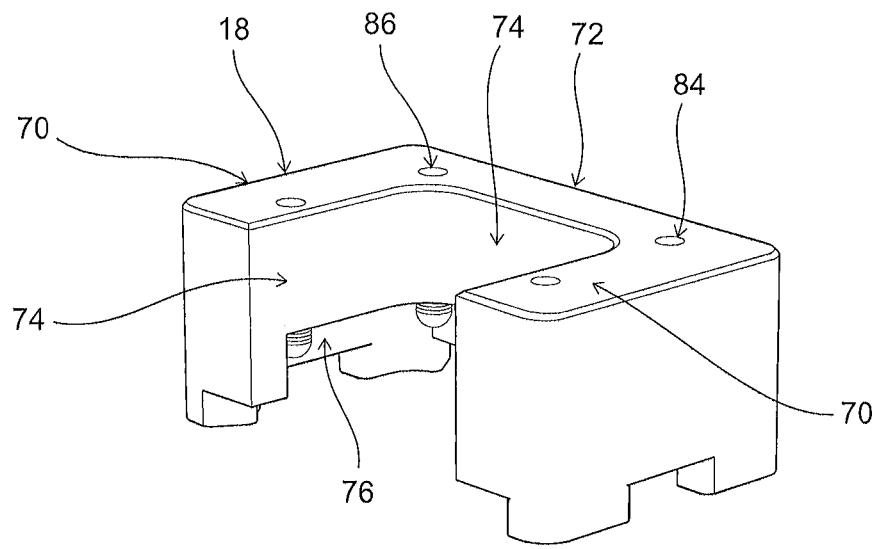

FIG. 1 shows a perspective view of an alignment system 2 where the alignment frame 18 is shown transparently with an outline of its structure. FIGS. 12a and 12b show perspective views of the same alignment frame 18 by itself with driving components 22.

For the purposes of describing the frame 18, a coordinate system is used (similar to that shown in FIG. 1) with reference to the orientation that the frame 18 has when mounted on the PCB 8.

Accordingly, the bottom surface 36 is in contact with the top surface 10 of the PCB 8. The term 'vertical' is intended to be the dimension extending perpendicularly outward from the top surface 10 of the PCB 8. The term 'horizontal' is intended to be the dimension extending parallel to the plane of the frame bottom surface 36 and PCB 8. The 'X axis' and 'Y axis' are both parallel to the plane of the top surface 10 of the PCB 8 where the 'X' axis corresponds to the width of the frame 18 and alignment component 12; and the Y axis corresponds to the depth of the frame 18 and alignment component 12, (i.e. depth and width are horizontal dimensions). Last, the z axis is vertical and corresponds to the height of the frame 18 and alignment component 12.

The alignment frame 18 preferably comprises a U-type shape in the plane of the top surface 34 of the frame 18. In principle the shape of the alignment frame in the plane of the top surface may be any shape including a close shape. The U shape comprises two opposing horizontally and vertically extending side walls 70 along the Y-Z axis adjoined by a vertically extending back wall 72 running along the X-Z axis. The side walls 70 and back walls 72 of the frame 18 extend the U shape downwardly from the top surface 34 towards the bottom surface 36 of the frame 18. The inner surfaces 74 of the back wall 72 and side walls 70 extend perpendicularly vertical from the inner periphery of the U shaped frame top surface 34, wherein at a particular height above the bottom surface 36 of the frame 18, a portion of the inner surface 74 of each of the side walls 70 and the entire width of the inner surface of the back wall 72, recess outwardly from the said inner wall surfaces 74 (hence inwardly into the thickness of the said walls) to form a cavity for accommodating the alignment component 12.

The said cavity preferably forms a further U-like shape. Accordingly, the outer vertical extending periphery of the cavity is defined by the vertically extending recessed surfaces of the sidewalls and back wall (hereinafter referred to also as the cavity sidewall surfaces 76 and cavity back wall surface 78). The said vertical recessed surfaces are connected to the nominal inner vertical surfaces 74 of the frames U-shape by a horizontally extending cavity ceiling 80. The cavity sidewall 76 and back wall 78 surfaces extend vertically downward from the cavity ceiling 80 to and through the bottom surfaces 36 of the frame 18. The recessed portions of the sidewalls 70 connect with the recessed portion of the back wall 72. The portions of the cavity within the sidewalls 70 terminate along the Y axis (in a direction away from the back wall) before the outer end surfaces of the sidewalls 70. Each sidewall 70 therefore comprises a vertically extending recessed surface (hereinafter referred to also as the cavity front wall surfaces 82) that opposes the cavity back wall surface 78.

The frame 18 is preferably shaped and sized so that:
the height of the cavity (hence height of the cavity sidewall 76 and back wall 78 surfaces) is greater than the height of the alignment component 12; this allows the alignment component 12 to be moved in the movement plane 32 without contacting the cavity ceiling 80;
the width of the cavity (i.e. the direct distance between the opposing cavity sidewall surfaces 76) is greater than the width of the alignment component 12; this allows the alignment component 12 to be moved along the X axis in the movement plane 32;
the depth of the cavity (i.e. the direct distance between cavity back wall surface 78 and corresponding opposing cavity front wall surfaces 82) is greater than the depth of the alignment component 12; this allows the alignment component 12 to be moved along the Y axis;
the distance between the nominal (un-recessed) inner sidewall surfaces 74 is less than the width of the alignment component 12.

Such a size and shape allows the alignment component 12 to be housed by the PCB 8 and the frame 18, but still moveable in the movement plane 32. In principle, any suitable size and shape of frame 18 may be used and the frame may comprise some, all or none of the features as described herein.

The U shaped frame sidewalls 70 and back wall 72 of the alignment frame 18 have four through-holes 20, extending from the frame top surface 34 exiting through the cavity ceiling 80. The four through holes 20 are sized to accommodate four driving components 22 (which in this example are adjustment screws). The through holes 20 each comprise a threaded internal surface that allows the corresponding adjustment screw 22 to be rotationally driven downwards through the hole 20. Preferably the through holes 20 are threaded along the entire length of the holes 20. Preferably the through holes 20 are configured so that the adjustment screws 22 may be inserted into the holes 20 from the top surface 34. In an alternative example, the diameter of the opening of the holes in the top surface of the frame may be smaller than the diameter of the screw, so that the screws cannot protrude from the top of the holes, but may be accessed by a screw driver/Allen key (or other tool).

The position of each of the frame through holes 20, in the X-Y plane, corresponds to the desired X-Y contact positions on the alignment component 12. Preferably the positions of the through holes (hence the X-Y contact positions that the adjustment screws make with the alignment surfaces) are symmetrical about a virtual Y axis running through the middle of the U shape.

Preferably each adjustment screw 22 is a ball ended screw wherein the ball end is oriented to contact the alignment surface 28A-C.

The alignment frame 18 further comprises four closed ended screw holes 86 and three closed ended dowel pin holes 84 extending vertically upwards from the frame bottom surface 36. Each of the said closed ended screw holes 86 comprising an internal threaded surface for engaging a fixing screw 52 affixed from the underside of the PCB. Each of the said closed ended dowel pin holes 84 are sized to frictionally fit a portion of a dowel pin 48 where the other portion of the dowel pin 48 locates into a corresponding hole 44A in the PCB 8.

The four screw holes 86 are positioned in the X-Y plane at locations proximate to the opposite ends of each of the side walls 70 (i.e. the two corners where the sidewalls 70 join the back wall 72 and the end portions of the sidewall 70). The back wall 72 and two sidewalls 70 vertically extend from the top surface 34 to the bottom surface 36 of the frame 18 at the said terminating ends of the U and corners adjoining the back wall 72 to the sidewalls 70. These areas correspond to where the four fixing screw holes 86 are located in the X-Y plane. In between these areas the bottom surfaces of the sidewalls 70 and back wall 72 are raised to form a through channel defined by the raised portions of the bottom surfaces and the top surface 10 of the PCB 8. [I.e.

along the back wall 72 between two of the screw holes 86 (FIG. 7, screws C and D) aligned along the X axis, and along the sidewalls 70 between the screw holes 86 aligned along two parallel Y axes (FIGS. 7 A-C, and B-D)]. These channels extend from the outer peripheral back and sidewall wall surface through to the inner peripheral back and sidewall surfaces 74 and allow any electrical tracks on top of the PCB 8 to run towards the optical engine 6 without being damaged or otherwise interfered with by the bottom surface 36 of the frame 18.

In Plane Alignment

FIG. 7 shows a plan view of the alignment component 12 of this example with four driving components 22 (adjustment screws A, B, C and D). Adjustment screws C and D are positioned within the frame 18 with their centres along a first axis 88 whilst the adjustment screws A and B are positioned with their centres coinciding along a second axis 90 parallel to the first axis 88. For purposes of describing the alignment of the optical component 4 presented herein, the X, Y and Z axes correspond to those as described above and shown in FIGS. 1 and 7 wherein the term X axis is used to denote the axis parallel to the first axis spanning between the adjustment screws C and D, whilst the Y axis is perpendicular in the plane to this X axis. The term "Z axis" is any axis extending orthogonally out of the movement plane 32 that the adjustment screws 22 and alignment surfaces 28A-C may cause the alignment component 12 to rotate about. FIG. 7 shows the Z axis to be mid-way between screws C and D along the X axis and in between screws B and D along the Y axis, however any axis of rotation may be referenced as the Z axis.

Each of the adjustment screws A-D is configured to contact the alignment component 12 over a particular contact region of the alignment surfaces 28A-C. The actual point that the screw contacts the alignment surface 28A-C in the X-Y plane is the X-Y contact position.

The point in the Z axis where each screw 22 contacts its associated alignment surface 28A-C depends upon the position of the alignment component 12.

The angles that the alignment surfaces 28A-C subtend in the plane dictate the direction of the imparted force (in the movement plane) acting on the alignment component 12 when transmitted via the downward linear motion 24 of the adjustment screw 22. In the example shown in FIG. 7, the direction of the imparted force, in the movement plane, is along the normal extending inwardly into the alignment component 12 from the alignment surface 28A-C. The position the said normal starts from is the X-Y contact position that the associated adjustment screw 22 has made with the said surface 28A-C.

The angles that the alignment surfaces 28A-C subtend from the vertical Z axis (i.e. from the normal 26 extending perpendicularly upwardly from the top surface 10 of the PCB 8) affect the ratio of the amount of linear movement the screw 22 has to make vertically downwards to move the alignment component 12 a certain distance. Preferably this angle is between 5 degrees to 30 degrees from the normal 26.

The second 28B and third 28C alignment surfaces (associated with screws A and B respectively) are preferably angled from the Y axis in the movement plane 32 and positioned, together with the X-Y positions of the corresponding adjustment screws 22, to give rise to an imparted force 30 pointing between the first and second X-Y contact positions associated with screws C and D. Preferably, the angle in the X-Y plane of alignment surfaces 28B and 28C together with the X-Y positions of the associated adjustment screws A and B, provides imparted forces 30 that point substantially towards the mid-point between the X-Y positions of the screws C and D.

Preferably the X positions of both of the C and D screws are between the X positions of the A and B screws.

The method of aligning the optical component 4 (housed in the alignment component 12) is based on the simple principle of displacement. In this example, it means using advancing or retreating screws 22 to create or remove that displacement. When the ball end of an advancing adjustment screw 22 makes contact with an angled alignment surface 28A-C of the alignment component 12, it will begin to apply a force 30 perpendicular to the contact position and any further advance will push the alignment component 12 away from the rotational axis of the screw 22. For this to happen however, one or more of the other three screws 22 must be backed off (retreated) if the alignment component 12 is already in contact with those screws 22. This will allow free space for the alignment component 12 to move into until it again contacts the other screws 24.

When performing an alignment, there may be some trial and error adjustments to the screws 22 in order to get the alignment component 12 (hence optical component 4) into the optimum location and thereby have maximum light coupling. This would normally be done actively; meaning that there would be light transmitted down one side of the system and then measured in the other side of the system. In the case of the optical engine 6, it would be possible to transmit light out of all of the transmit lasers, couple that light into the mating ferrule 4 and then loop back the transmit fibres to the receive side of the optical engine 6 where the light is detected. When the best alignment of the ferrule 4 to the optical engine 6 is achieved, all the channels would be showing a maximum of light transmission.

If the alignment system is configured to align two ferrules, there would need to be transmission of light on at least the two outer fibres of the fixed ferrule. The other ferrule being aligned to it would then have detectors on the opposite end of its fibres to detect and measure light levels on the same locators. By doing this, the X, Y and Z axis rotation can all be maximized for the best light coupling.

Once the best coupling and therefore best position for the alignment component has been achieved, it can be locked into position with locking screws 50 located underneath. A locking agent such as epoxy may also be placed on the join to the PCB 8. In the case of a ferrule to ferrule needing to be permanently aligned, the same technique can be used after the locking screws 50 are tightened.

Various movements in the movement plane (X-Y) may be generated by adjusting various combinations of the adjustment screws 22. The following list provides some of the movements where linear movement (along the X and Y axis) and rotational movement (about one or more Z-axis) may be generated:

1. If screw A is loosened and screw B is tightened, the alignment component 12 will move to the left (negative X axis), sliding along the screws C and D.

2. If screw B is loosened and screw A is tightened, the alignment component 12 will move to the right (positive X axis), sliding along the screws C and D.

3. If screws C and D are loosened by the same amount and screws A and B are tightened, the alignment component 12 will move down (negative Y axis).

4. If screws A and B are loosened by the same amount and screws C and D are tightened, the alignment component 12 will move up (positive Y axis).

5. If screws A and C are loosened and then screw B is tightened, the alignment component 12 will move left and down (negative X and Y axis) as well as rotate counter-clockwise about the Z axis.

6. If screws B and D are loosened and then screw A is tightened, the alignment component 12 will move right and down (positive X and negative Y axis) as well as rotate clockwise about the Z axis.

Using these basic movements, it is possible to shift the alignment component 12 in any direction and rotation in order to align it with a ferrule 4 to the fixed component 6.

The alignment component 12 and/or frame 18 may be formed of any suitable rigid material for example a plastic or a metal. In principle however, any suitable material can be used.

Other Variations

Figure 8A:
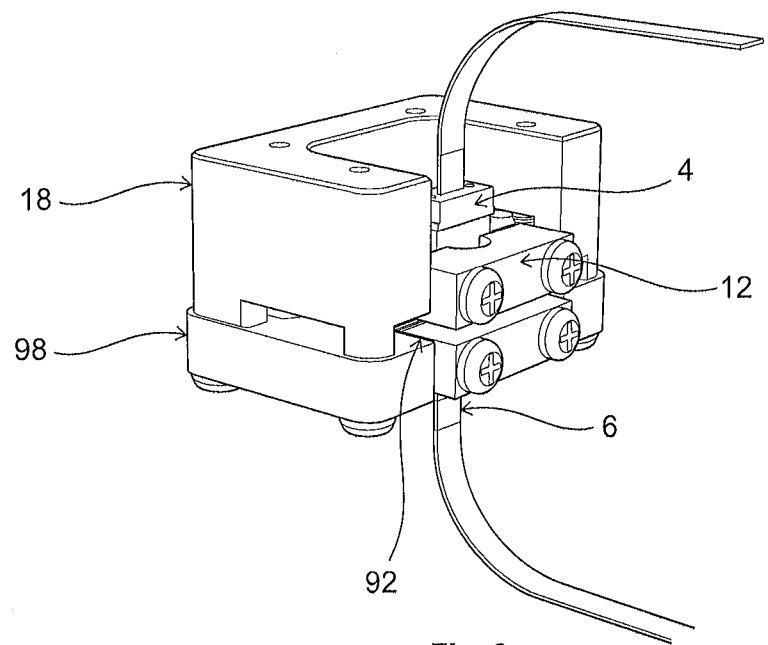
FIGS. 8a and 8b show another example of an optical alignment system.
Figure 8B:
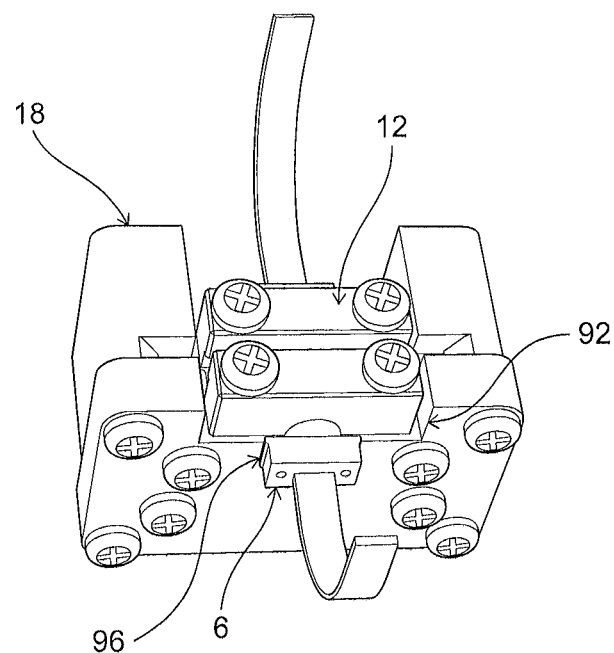

FIGS. 8a and 8b show perspective top and bottom views of a variant of the alignment system 2. In place of a PCB 8 with an optical engine 6, another MT ferrule with a fibre tail is shown clamped to a platform 98. The platform 98 in this example comprises first rectangular slot 92 horizontally indented from one of the side surfaces of the platform 98. The first slot 92 is sized to accommodate a clamping block 94 and comprises, along the back surface of the first slot (parallel to the nominal side surface) a second horizontally indented slot 96 sized to accommodate a second optical component 6 (in this case the further MT ferrule). The said back surface of the first slot comprising laterally extending holes spaced either side of the second slot. The said holes are sized and configured to accommodate and engage with platform fixings (in this example screws). The clamping block 94 comprises two through holes sized to pass the threaded section of the said fixing screws. The clamping block 94 together with the first 92 and second 96 slots, and the fixing screws, are configured to rigidly secure the ferrule to the platform 98 when the screws are screwed into the holes along back surface of the first slot 92.

In principle any fixing mechanism may be used to fix the clamping block 94 to the platform 98 and rigidly secure the further ferrule 6. The further ferrule 6 is clamped in place such that the end optical facet/s of the ferrule 6 are optically accessible from the top surface of the platform 98, whereby the optical path to/from the further MT ferrule 6 is along the Z axis.

The platform 98 mounts directly to the alignment frame 18 in the same manner as if a printed circuit board 8 were used.

Figure 9A:
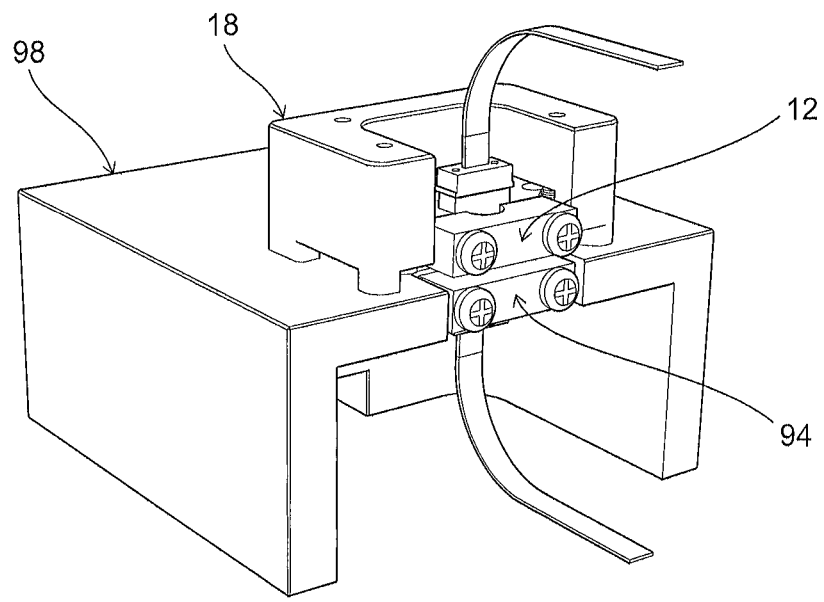
FIGS. 9a and 9b show a further example of an optical alignment system.
Figure 9B:
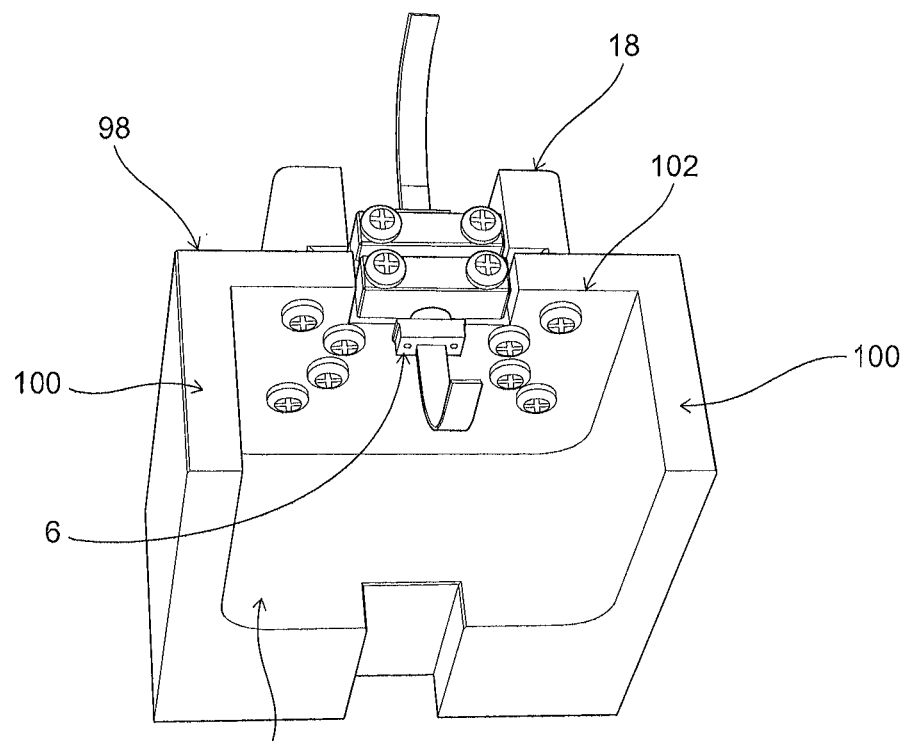

FIGS. 9a and 9b show perspective top and bottom views of a further variant of the alignment system 2. This version is substantially similar to that shown in FIGS. 8a and 8b but uses a different platform 98. The platform 98 in FIGS. 9a and 9b comprise at least two (in this example 3) sidewalls 100 and a platform ceiling 102 that the frame 18 and alignment component 12 fix to. The platform sidewalls 100 extend perpendicularly downwards from the ceiling 102 (not however extending from the portion of the ceiling 102 that comprises the indent first slot 92) and are configured to contact an optical bench so that the ceiling portion 102 of the platform 98 is raised above the supporting optical bench.

Embodiments of the present invention have been described with particular reference to the examples illustrated. However, it will be appreciated that variations and modifications may be made to the examples described within the scope of the present invention.

The invention claimed is:

1. An optical alignment system for aligning an optical component, the system comprising:
    an alignment component configured to be moveable in a plane and in a fixed relationship with the optical component; and
    a driving component configured to be moveable, relative to the alignment component, in a first linear direction wherein at least a component of the first linear direction is parallel with the normal of the plane,
    wherein the optical alignment system is configured such that the driving component, when forced along the first linear direction and in contact with the alignment component, imparts a force upon the alignment component, in the plane, to move the optical component in the plane.

2. A system as claimed in claim 1 wherein the first linear direction is substantially parallel with the normal of the plane.

3. A system as claimed in claim 1 wherein the alignment component comprises an alignment surface non-parallel with the plane and configured to contact the driving component.

4. A system as claimed in claim 3 wherein the alignment surface is angled between 5-30 degrees from the normal of the plane.

5. A system as claimed in claim 4 wherein the alignment surface is angled between 5-10 degrees from the normal of the plane.

6. A system as claimed in claim 3 further comprising:
    a plurality of driving components; and
    a plurality of alignment surfaces,
    wherein the alignment component comprises at least one of the plurality of alignment surfaces,
    wherein each alignment surface is associated with at least one of the plurality of driving components, and
    wherein the system is configured such that each driving component, when forced along its respective first linear direction and in contact with its associated alignment surface, transmits an imparted force upon the associated alignment surface, in the plane.

7. A system as claimed in claim 6 further comprising:
    one or more first alignment surfaces of the plurality of alignment surfaces;
    one or more second alignment surfaces of the plurality of alignment surfaces, each running along an oblique angle in the plane to the one or more first alignment surfaces; and
    one or more third alignment surfaces of the plurality of alignment surfaces, wherein each of the one or more third alignment surfaces runs along an oblique angle in the plane to the one or more first alignment surfaces and is oppositely oriented in the plane to the one or more second alignment surfaces.

8. A system as claimed in claim 7 configured such that:
    at least a first and a second driving component are each configured to contact at least one of the one or more first alignment surfaces at a respective first and second contact position in the plane and transmit respective first and second imparted forces along a first direction in the plane;
    at least a third driving component is configured to contact one of the one or more second alignment surfaces at a third contact position in the plane and transmit a third imparted force along an oblique angle in the plane to the first and second imparted forces; and at least a fourth driving component is configured to contact one of the one or more third alignment surfaces at a fourth contact position in the plane and transmit a fourth imparted force along an oblique angle in the plane to the first and second imparted forces and oppositely oriented to the third imparted force.

9. A system as claimed in claim 8 wherein the first and second driving components are spatially separated in the plane,
wherein the third driving component and second alignment surface are configured such that the direction of the third imparted force extending from the third contact position points between the first and second contact positions, and
wherein the fourth driving component and third alignment surface are configured such that the direction of the fourth imparted force extending from the fourth contact position points between the first and second contact positions.

10. A system as claimed in claim 8 wherein the first and second contact positions lie substantially on a first axis in the plane,
wherein the third and fourth contact positions lie substantially on a second axis in the plane, and
wherein the first and second axis are parallel and spaced apart in the plane.

11. A system as claimed in claim 10 wherein the third and fourth contact positions are spaced farther apart than the first and second contact positions.

12. A system as claimed in claim 6 wherein the alignment component comprises the plurality of alignment surfaces.

13. A system as claimed in claim 1 wherein the alignment component is configured to house the optical component.

14. A system as claimed in claim 1 wherein the driving component comprises a screw.

15. A system as claimed in claim 1 further comprising an alignment frame; wherein the driving component is at least partially accommodated within the alignment frame.

16. A system as claimed in claim 15 wherein the alignment frame comprises one or more through holes; each through hole configured to accommodate the driving component.

17. A system as claimed in claim 16 wherein each through hole is substantially elongated along an axis perpendicular to the plane.

18. A system as claimed in claim 15 further comprising a platform comprising a fixing for removably attaching the alignment frame and the alignment component.

19. An optical alignment component configured to be contactable by an external driving component and move along a reference surface in an alignment plane and rigidly secure an optical component, wherein the optical alignment component comprises:
one or more base surfaces parallel to the alignment plane and configured to slide upon the reference surface; and
a plurality of alignment surfaces, each at an oblique angle to the normal of the base surface extending away from the reference surface; the plurality of alignment surfaces comprising:
one or more first alignment surfaces,
one or more second alignment surfaces, each running along an oblique angle in the alignment plane to the one or more first alignment surfaces, and
one or more third alignment surfaces, wherein each of the one or more third alignment surfaces runs along an oblique angle in the alignment plane to the one or more first alignment surfaces and is oppositely oriented in the alignment plane to the one or more second alignment surfaces.

20. An alignment frame for aligning an alignment component upon a reference surface of a platform; the alignment frame comprising:
an attachment to rigidly secure the frame to the platform;
at least a first surface remote from the reference surface;
at least a second surface remote from the reference surface;
a plurality of driving components for contacting an optical component; and
a plurality of through holes, wherein each through hole extends between a first surface and a second surface along the same direction as the other through holes and is configured to accommodate a separate one of the driving components and allow the driving component to at least partially move out of the through hole from the first surface and contact the alignment component.

21. A frame as claimed in claim 20 wherein a first and a second of the plurality of through holes are located upon a first axis parallel to an alignment plane, and wherein a third and fourth of the plurality of through holes are located upon a second axis parallel to the alignment plane and parallel to the first axis.

22. A frame as claimed in claim 21 wherein the first and second holes are symmetrical about a third axis, wherein the third axis is parallel with the alignment plane and perpendicular to the first axis and second axis, and wherein the third and fourth holes are symmetrical about the third axis.

* * * * *